United States Patent

Rabiger

[15] 3,704,585
[45] Dec. 5, 1972

[54] PROCESS FOR CONTROLLING AND REGULATING PISTON-DRIVEN ENGINES WITH HYDROSTATIC MOTION TRANSDUCERS

[72] Inventor: Wolfgang Rabiger, Buckenhofen, Germany

[73] Assignee: Grundig E.M.V., Furth/Bay, Germany

[22] Filed: Dec. 14, 1970

[21] Appl. No.: 97,787

[30] Foreign Application Priority Data

Dec. 23, 1969 Germany............P 19 64 454.3

[52] U.S. Cl..................60/1, 60/54.5 R, 60/DIG. 1, 60/DIG. 2, 91/459
[51] Int. Cl..................................................F01b 9/00
[58] Field of Search...60/19, DIG. 1, DIG. 2, 1, 10.5, 60/54.5 R; 91/393, 398, 459

[56] References Cited

UNITED STATES PATENTS

| 2,588,742 | 3/1952 | McCallum | 60/DIG. 2 |
| 3,290,996 | 12/1966 | Floyd | 91/1 |
| 3,525,215 | 8/1970 | Conrad | 60/19 |
| 3,583,508 | 6/1971 | Waddington | 60/19 |

FOREIGN PATENTS OR APPLICATIONS

| 1,157,876 | 11/1963 | Germany |
| 1,179,778 | 10/1964 | Germany |

*Primary Examiner*—Edgar W. Geoghegan
*Attorney*—Lewis H. Eslinger, Alvin Sinderbrand and Curtis, Morris & Safford

[57] ABSTRACT

An apparatus and method for controlling a piston engine hydrostatic movement convertor by activating a valve for applying fluid to and for withdrawing fluid from the convertor. The valve is controlled by a correspondence error signal and a dead point error signal. The former signal is derived from a comparison of the position of the piston and the angle of rotation of a driving shaft and represents divergence of the piston and shaft from their required relative positions. The dead point error signal is derived from measuring any discrepancy between a nominal dead point and the actual dead point attained by the piston. At any instant, one of the error signals controls the fluid valve as determined by the engine speed. When the engine speed is below a predetermined rate the correspondence signal regulates, and when the speed is faster the dead point error signal controls. Preferably, the transfer of control from the correspondence error signal to the dead point error signal occurs at a higher speed than that at which transfer is made from the dead point error signal to the correspondence error signal.

15 Claims, 8 Drawing Figures

PROCESS FOR CONTROLLING AND REGULATING PISTON-DRIVEN ENGINES WITH HYDROSTATIC MOTION TRANSDUCERS

The invention relates generally to controls and methods of control and particularly to method and apparatus for controlling and regulating piston driven power engines with hydrostatic motion converters.

Piston engines with hydrostatic movement convertors of the type described, for example, in West German Pat. Nos. 1,179,778 and 1,252,964, have a great advantage over engines without the convertors in that the entire stroke of any particular piston, from top dead center to bottom dead center, is not constrained to half-revolutions of the crank shaft. The working shaft in these engines, due to the specific construction of the hydrostatic motion convertor, need only complete a fraction of a half rotation. This gearless speed regulation, moreover, is particularly effective because the working shaft is practically free of radial forces; consequently, a reduction in the shaft speed does not increase the bearing pressures, but produces a corresponding increase in effective engine torque.

These engines however, produce substantial and practically uncontrollable problems because the power transmission from the piston through a hydrostatic motion transducer to the working shaft occurs by virtue of the backward and forward oscillation of a liquid column, i.e., through a variable, and continuously changing medium. In contrast, a piston-driven engine with conventional connecting rods and crankshaft, establishes a fixed relations between piston position and the angle of crankshaft rotation.

Quite different conditions prevail, however, in hydrostatic motion convertors, because the quantity and volume of the hydraulic fluid (which is analogous to the connecting rods in convention engines varies. For example, sliding seals are used in order to confine the convertor fluid. In this environment, the seals operate against a back pressure and often produce large and irregular leakage losses. These leakage losses, moreover, are frequently superimposed on volume changes that are caused for example by temperature or pressure variations.

These unavoidable changes in the hydraulic fluid become hazardous, particularly at the piston top and bottom dead centers. To prevent destroying the engine when, for instance, the nominal piston top dead center is exceeded as a result of these fluid changes, safety valves have been proposed. These valves have taken the form of pressure relief valves or outlet flow channels, through which the hydraulic fluid can discharge. On the other hand, failure of the piston to reach the nominal top dead center, produces an undesirable engine performance loss. West German Pat. No. 1,213,191, proposes supplementing the outlet flow channels with inlet channels and disconnecting or locking the inlet and outlet channels, through a coupling to the working piston, when the piston is in the vicinity of the nominal dead center. Because only one kind of these channels or control valves need operate during each piston stroke, the inlet and outlet channels are connected to a practical, predetermined control program through a system of pressure equalizer cylinders, springs and timing constants.

A control program of this sort, based on time and amount of flowing liquid, can operate satisfactorily only at predetermined conditions. Consequently, this technique fails, for example, if engine operating speed is changed substantially, or if there is a significant change in the magnitude and direction of the leakage losses. This control program, moreover, only establishes the dead center position of the working piston without correlating the piston position with the rotation angle of the working shaft.

West German Pat. No. 1,157,876 proposes to overcome this disadvantage through the use of a compensator that produces electrical signals in response to the position of the working piston and the rotation angle of the drive shaft. These signals are compared in a bridge circuit that generates another signal to activate a channel with drains hydraulic liquid from the transducer, or admits liquid to the transducer through an inlet channel, as appropriate. There are, however, disadvantages in this approach. Illustratively, the means that senses the piston position must have a high resolution, and the bridge circuit must be capable of distinguishing between control signals and changes in the resolution of the piston sensing device. Changes in the state of the hydraulic fluid also lead to some difficulty. For example, a temporary loss of liquid volume due to hydraulic fluid compression, causes excessive safety valve movement and attendant wear.

These disadvantages are overcome through a dead center error signal that is established by comparing the actual dead center position of a piston with the designed preestablished dead center position of the piston when the engine speed is above a particular level. If the engine speed is below the predetermined level, however, piston position is achieved through a comparison of the piston position and an output drive shaft.

Before and during engine startup the working piston is brought to its exact position relative to the angular position of the drive shaft, so that control valve movement is reduced to a minimum during engine operation.

The electrical control and method of this invention readily enables the hydraulic liquid to flow into the hydrostatic motion transducer during periods of low operating pressure, or to draw hydraulic liquid from the transducer during periods of high operating pressure. It is also possible through the practice of this invention to change the engine compression and thus optimize efficiency for the engine speed and load condition. These features are highly desirable, especially in marine diesel engines which must operate over long distances under different loads and shaft speeds.

An object of the present invention is to provide an apparatus and method of quiet, uniform engine control and regulation.

Another object of the invention is to provide in a piston engine hydrostatic movement convertor, a control and method of control which has simplicity, flexibility, and which may be tailored to match engine characteristics, (e.g. size and operating performance of load) as well as lending itself to automatic operation if necessary.

A still further object of the present invention is to provide a piston engine hydrostatic movement convertor control apparatus and method of control which avoids hunting and thereby reduces wear of the control components.

According to the invention there is provided an apparatus for controlling a piston engine hydrostatic movement convertor by actuation of a valve for applying fluid to, and for withdrawing fluid from, the convertor. The control apparatus includes means for comparing the position of a piston and an angle of rotation of a driving shaft and for deriving therefrom a correspondence error signal representing any divergence of said piston and shaft from their required relative positions; means for developing a dead-point error signal representing any discrepancy between a nominal and actual dead-point attained by the piston; and means responsive to the engine speed to transfer control of said valve to said dead-point error signal when said engine speed exceeds a predetermined engine speed and to said correspondence error signal when the engine speed falls below a selected speed. Thus, the fluid pressure in the convertor is controlled by the position error signal below a selected engine speed and by the dead-point error signal above a predetermined engine speed.

According to a further aspect of the invention there is provided a method for regulating the position of a working piston in a piston engine hydrostatic motion convertor including the steps of adding and withdrawing hydraulic fluid from the motion convertor, observing the position of the piston and the rotational angle of the drive shaft, converting said observation into a correspondence error signal in response to said piston and drive shaft being out of synchronization; controlling the flow of hydraulic fluid into and out of the convertor to reduce said correspondence error signal; comparing the actual dead point position of the piston with the designed and preestablished nominal dead point position of the piston, forming a dead point error signal in response to said comparison, controlling the flow of hydraulic fluid into and out of the convertor to reduce said dead point error signal, and switching said hydraulic fluid flow control to be activated by said correspondence error signal below a predetermined engine speed and to be activated by said dead center error signal above a chosen engine speed.

The construction of illustrative embodiments as well as further objects and advantages thereof, will become apparent when read in conjunction with the accompanying drawings wherein.

Figure 3A:
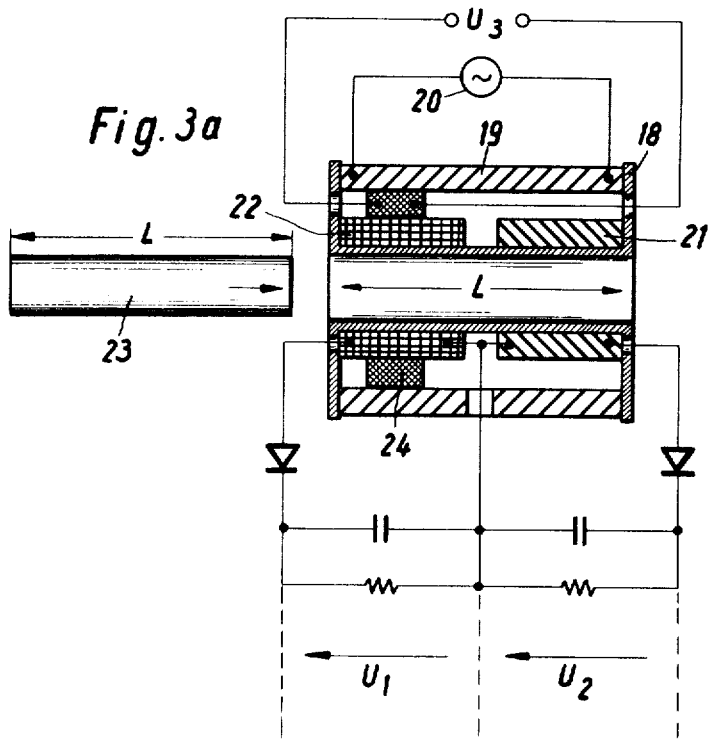
Figure 3B:
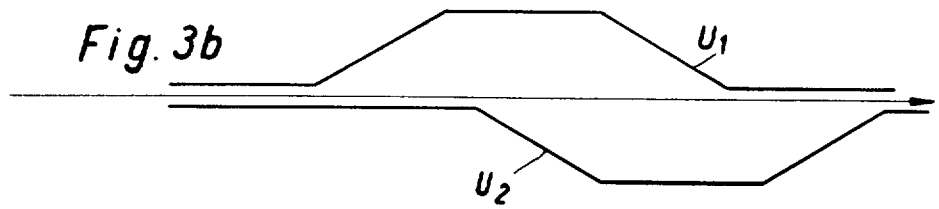
Figure 3C:
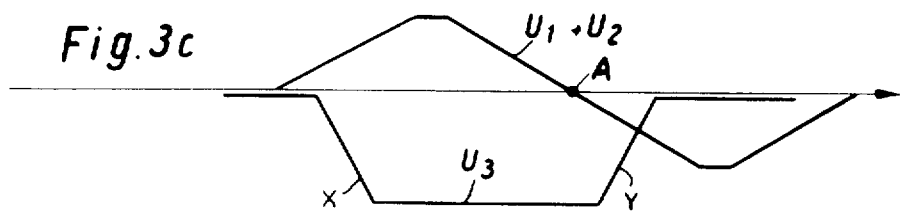

FIGS. 3a, 3b, and 3c show a typical position transducer for use in connection with the invention and voltage patterns associated therewith.

Figure 2:
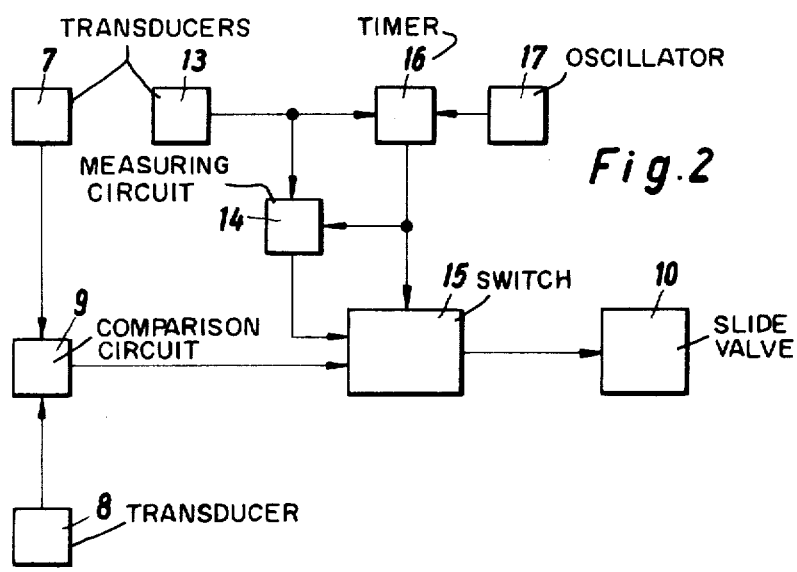
FIG. 2 shows a schematic diagram of an illustrative embodiment of the invention.
Figure 4:
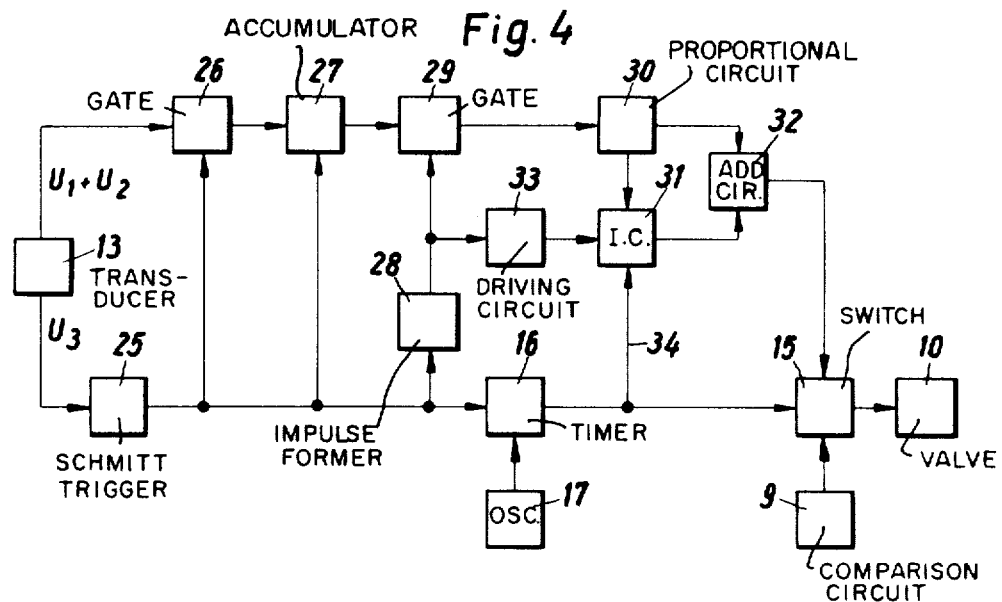

FIG. 4 is a more detailed diagram of the embodiment of the invention shown in FIG. 2.

Figure 5:
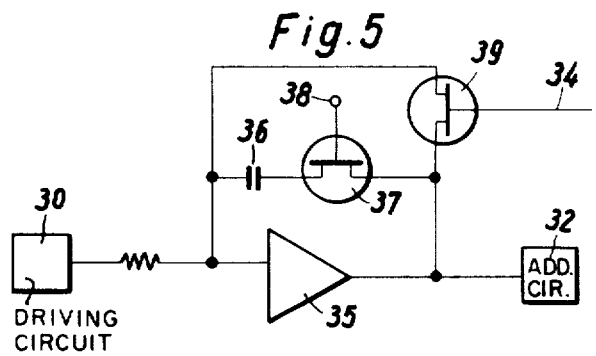

FIG. 5 is a diagram of a typical storage device for use with the invention, and

Figure 6:
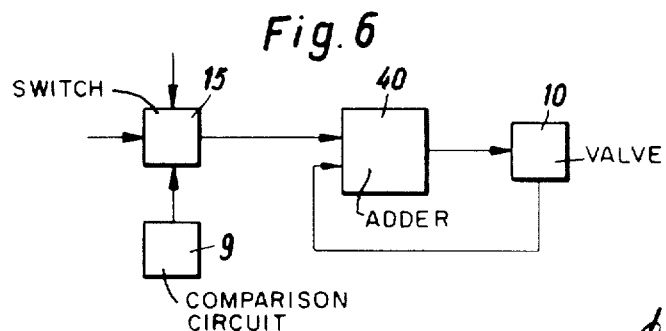

FIG. 6 is a diagram of a regulation device that can be used with the system shown in FIG. 4.

Figure 1:
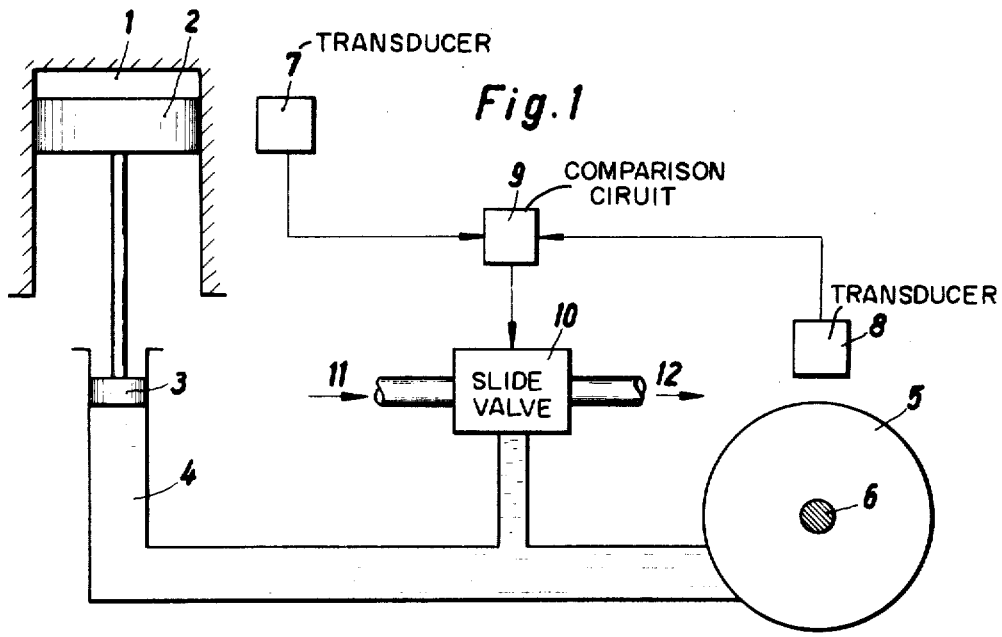
FIG. 1 shows for the purpose of background, a prior art system of the type described in West German Pat. No. 1,157,876.

To review the background needed for a more detailed appreciation of the present invention, the system described in the aforementioned West German Pat. No. 1,157,876 is shown in FIG. 1. Typically, a working piston 2 sliding in a working cylinder 1 is rigidly connected to a power transmitting piston 3 which combines with a hydraulic fluid 4 and a rotational transducer 5 to make up a piston engine hydrostatic motion convertor. A transducer 7, working in connection with the piston 2 and a transducer 8 coupled to a working or drive shaft 6, provide electrical signals that correspond to the position of the piston 2 or the rotation angle of the shaft 6, respectively. These signals are sent to a reference or comparison circuit 9 which forms a correspondence or position error signal proportional to the difference between the required portions of the pistons and shaft. A slide or control valve 10 receives the error signal and regulates the hydraulic medium 4 to flow either in the direction of arrow 11 from a hydraulic medium reservoir into the motion convertor, or out of the convertor in the direction of arrow 12.

In operation, the transducer 7 senses the actual top dead center of the working piston 10 and the transducer 8 senses the angular orientation of the shaft 6. The reference circuit 9 registers any discrepancies that might exist between the relative positions of shaft and piston and sends an error signal to the slide valve 10. The slide valve responds to this signal by discharging the hydraulic fluid from the system or adding more fluid, as the situation requires.

The present invention is illustrated in connection with the embodiment shown in FIG. 2. The correspondence or position signal transducers 7 and 8 produce output voltages that are compared in the circuit 9. Typically, the transducers 7 and 8 may be alternating current synchro indicators, and the circuit 9 a phase-synchronous rectifier. A transducer 13 provides a dead-point error signal, which is processed in a measuring circuit 14, to be described later. The transducer 13 sends a signal only as long as the appropriate piston is in the immediate vicinity of the top dead-point; hence, time between two signals is a measure of engine speed, as for instance, in revolutions per minute (rpm). This time between the top dead center signals, is determined in a comparison timer 16 by comparison with a signal from a reference oscillator 17.

If this elapsed time between dead-point and oscillator signals falls below a certain minimum value, the timer 16 sends a signal to a selector or change over switch 15. The switch 15 then shifts a hydraulic fluid control 10, which had been regulated by the output from the reference circuit 9, to the output from the measuring circuit 14. Operational needs may require the engine speed to remain at the value chosen for switching between position control (7,8,9) and top dead-point (13,14) control. This speed is chosen, moreover, on the basis of engine performance characteristics. This situation can lead to continuous alternating activation of the switch 15 and produce a severe control "hunting" condition. In accordance with a feature of the invention, this unstable condition is overcome through the timer 16. Typically, the engine speed at which the switch 15 shifts the fluid control from the correspondence or position signal to the dead-point signal is higher (at 15 rpm, for example) than the engine speed at which the switch 15 shifts the hydraulic fluid control 15 back from the dead center signal to the synchronism signal (at 10 rpm, for example).

The dead center signal transducer 13 registers only a small fraction of the total piston stroke, but accomplishes this function with a very high resolution. Although in principle this resolution can be attained with any position transducer, an inductive position transducer, as for example a differential transformer, has been especially well suited to the practice of the invention.

As shown in FIG. 3a, a differential transformer of this sort includes a spool or bobbin 18, having primary winding 19 connected to a suitable alternating current voltage source 20. Voltages are induced in a pair of secondary windings 21 and 22. These voltages are rectified by diodes and resistors and a capacitive network as shown in the figure. A core 23 made of weakly magnetic material is connected to the piston (not shown in FIG. 3a by a guide rod (also not shown); and the core is inserted in the coil. The rectified partial voltages $U_1$ and $U_2$ from windings 21 and 22 have values that are a function of the depth of the core 22 within the coil and are shown in FIG. 3b. This is, of course, provided the core 23 has the same length L as the coil 18; and also assuming that for purpose of simplification that lateral scattering effects are neglected. The resulting sum of the voltages $U_1 + U_2$ is shown in FIG. 3. This voltage provides the measured control signal which will be described subsequently.

The transducer 13 (FIG. 2) and the guide rods (not shown) are arranged so that the zero voltage point A in FIG. 3c corresponds to nominal dead center for the working piston. Because the zero point A is ambiguous with respect to the directions of passage of the core 23 through the coil, it cannot be used directly for control purposes. Consequently, in accordance with another feature of the invention, tertiary winding 24 is wound on one of the secondary windings 22 and produces a voltage $U_3$. This voltage is shown in FIG. 3c as a function of the depth of the insertion of the core 23 into the coil. The voltage, moreover, indicates the direction of core movement relative to the predetermined nominal dead center zero point A. The voltage $U_3$ (as will be described below) is used to switch or gate the characteristic measured voltage $U_1 + U_2$ for recording, evaluation and control.

The diagram of FIG. 2 may be better understood by considering the more detailed embodiment shown in FIG. 4. Illustratively, the dead center signal transducer 13 transmits the measurement voltage $U_1 + U_2$ (FIG. 3c) and the indicator or gating voltage $U_3$. The gating voltage $U_3$ is applied to a threshold value convertor 25. If the piston reaches the top dead center region, the threshold voltage value also is reached in the convertor 25. Convertor 25 typically is a Schmitt triggercircuit providing a pulse. Typically, when the $U_3$ voltage reaches a certain value, e.g., at X in FIG. 3c, the transmitter 25 generates the leading edge of an impulse, the trailing edge of which will occur when the $U_3$ voltage decreases beyond another certain value, e.g., at Y in FIG. 3c. In order to avoid hunting of the system the leading edge of the impulse is built up at a higher threshold level, i.e., in a closer proximity of the piston to the nominal dead point than the trailing edge. An electrical switch or gate 26 is enabled by this pulse and passes the $U_1 + U_2$ signal through to a peak voltage accumulator 27. An accumulator of this sort may include a capacitor that can be charged to a suitable value by the leading edges of the pulse that is emitted from the threshold value convertor 25, and charged in an opposite direction, i.e., discharged, under the influence of the measurement voltage $U_1 + U_2$ which represents the penetration depth of the core 23 into the coil.

After the direction of piston motion reverses, and the core 23 goes in the opposite direction, the charge remaining in the accumulator 27 is a measure of the actual dead center just reached. This charge is gated by a circuit 29 to a proportional circuit 30. The gating is in response to a signal from an impulse former 28 which, in turn, is activated by the trailing edge of the impulse from the threshold value convertor 25.

The measurement voltage in the proportional measuring circuit 30 can be applied directly to the change over switch 15 as a dead point error signal. However, it is further used in accordance with the invention. For example, a fraction of the measurement voltage is formed in circuit 30. This can be integrated in an integration circuit 31 and the sum of the proportional voltage and the integral voltage are combined in an adder circuit 32. The combined signal is fed to the changeover switch 15 as the dead point error signal. In this case, the circuit 31 integrates over a fixer predetermined time, that is measured or defined by the time that is required for the emission of a pulse from a driving circuit 33. In this instance, the trailing edge of the scanned pulse produced by circuit 25 and shaped by an impulse former 26 will initiate a pulse of fixed duration from a circuit 33.

At the first switchover of the electrical selector switch 15 from the position reference circuit 9 to the dead-point regulator 14, it appears that the accumulated past history of the dead-point regulator not only lacks technical significance, but might even be harmful. To eliminate this source of harm, the integrator 31 may only begin to operate at the moment the timer element 16 sends a selector pulse to the selector switch 15. Consequently, the output from the timer 16 also is connected to an input of the integration circuit 31.

Combining the proportional signal from circuit 30 and the integral signal from circuit 31 in the adder circuit 32 to produce the resulting dead-point error signal is preferable in the practice of the invention. The invention, however, is not limited to a signal composition of this sort. Other techniques can be developed in accordance with other circuitry, e.g., a differential component may also be added to the dead-point error signal.

The integrator 31 can span a brief lapse in the operating current that is supplied to the regulator (at least during stationary operation) without the need for additional regulator pulses or the like because the last position assumed by the slide valve in the hydraulic fluid control is stored or remembered in the integrator 31. To separate this stored information from all external factors when operating current fails, a high inverse voltage switch may be provided.

An example of a switch of this sort is shown in FIG. 5. As shown, the integrator is provided in the form of an operational amplifier 35 with a feedback path that includes a capacitor 36 and a field effect transistor 37. A control electrode 38 of the field effect transistor 37 is kept at a suitable level to maintain the transistor 37 in the conducting state. When the operating voltage fails, the transistor 37 stops conducting and the charge on the capacitor 36 remains as a measure of the regulator state at the time of the operating voltage failure. Because the position of the slide valve in the hydraulic fluid control (FIG. 4) also cannot change after the voltage failure, the charge on the capacitor 36 will accurately reflect the position of the slide valve in the fluid control. The "back to operation" transition occurs smoothly after the operating voltage returns and the transistor 37 has turned on.

A field effect transistor 39, also shown in FIG. 5, demonstrates in an exemplary way how the integrator normally acts at the moment the command from the timer 16 (FIG. 4) is sent through the conductor to switch over to dead center regulation.

Depending on the construction of the hydraulic fluid control valve 10 in FIG. 4, it may be advisable or, perhaps, necessary to incorporate the setting of the valve itself into the control. A typical circuit which accomplishes this is shown in FIG. 6. This circuit establishes a feedback or check-back signal through a potentiometer (not shown) that is adjustable in response to the operation of the slide valve in the fluid valve 10. The feedback signal from the control 10 is combined in the adder 40 with the error signal that was gated through from the selector switch 15.

It was shown by FIG. 3c, for example, that nominal dead point can be predicted by passage of measured voltage $U_1 + U_2$ through zero-point A. If any arbitrary constant d.c. voltage is now imposed on this measured voltage $U_1 + U_2$, the zero-point A will be displaced depending on the magnitude and polarity of this added voltage. In accordance with another feature of this invention, nominal dead center can be adjusted in the foregoing manner in order to change the piston compression during operation and thereby optimize the thermodynamics of the combustion process in response to the engine operating state.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What I claim is:

1. An apparatus for controlling a piston engine hydrostatic movement convertor by actuation of a valve for applying fluid to and for withdrawing fluid from the convertor comprising means for comparing the position of a piston and the angle of rotation of a driving shaft and for deriving therefrom a correspondence error signal representing any divergence of said piston and shaft from the required relative positions; means for developing a dead-point error signal of a piston representing any discrepancy between a nominal and actual dead-point attained by the piston; and means responsive to the engine speed to transfer control of said fluid valve to said dead-point error signal when said engine speed exceeds a predetermined engine speed and to said correspondence error signal when the engine speed falls below a selected speed, whereby the fluid pressure in the convertor is controlled by the position error signal below a selected engine speed and by the deadpoint error signal above a predetermined engine speed.

2. Apparatus according to claim 1 wherein the engine speed at which transfer of control from the correspondence error signal to the dead-point error signal occurs is higher than that at which transfer occurs from the dead-point error signal to the correspondence error signal.

3. Apparatus according to claim 2, wherein the means for developing the dead-point error signal includes a core of soft magnetic material connected to the piston, and a coil assembly arranged to receive the soft core, prior to and when said piston passes the nominal dead-point, said coil assembly including a primary winding adapted to be connected to a source of alternating current, a pair of opposed secondary windings so positioned with respect to the primary winding that a combined secondary voltage induced therein passes through zero when said core attains a position corresponding to the presence of the working piston at the nominal dead-point, and a tertiary winding so positioned that the tertiary voltage induced therein rises monotonically between the entrance of the cores into the assembly and the nominal dead-point and then falls again, and means responsive to the voltages induced in said secondary and tertiary windings for developing a signal representative of the attainment by the piston of the nominal dead-point, and the dead-point error signal.

4. Apparatus according to claim 3, wherein said secondary voltage is applied to an evaluation means only during the intervals between said tertiary voltage exceeding a first threshold level and its falling below a second threshold level.

5. Apparatus according to claim 4 wherein said tertiary voltage attains said first threshold level when the piston is nearer to the nominal dead-point than the position thereof at which said tertiary voltage exceeds said second threshold level.

6. Apparatus according to claim 4 including means for measuring the peak value attained by said secondary voltage during the interval in which it is brought to a predetermined level when said tertiary voltage attains said first threshold level and from which the peak value of the secondary voltage measured between the first and second threshold levels is transmitted proportionally into a store when said tertiary voltage traverses said second threshold level.

7. Apparatus according to claim 6, wherein means are provided for integrating the voltage in said store to make up one component thereof and the integrated signal is additively combined with said voltage to form the dead-point error signal used to control said valve.

8. Apparatus according to claim 7 wherein the time of integration is proportional to the stroke of the piston.

9. Apparatus according to claim 8 wherein the time of integration commences at the instant at which the electronic switch changes over to apply the dead-point error signal to control the valve.

10. Apparatus according to claim 7 wherein said voltage is stored in the form of a charge on a capacitor and that switch means are provided which in the event of a power supply failure isolate the capacitor from the remainder of the circuit, so that the charge present upon the capacitor is retained.

11. Apparatus according to claim 3 wherein an auxiliary voltage of adjustable magnitude is superimposed upon said secondary voltage for varying the compression ratio of the engine.

12. Apparatus according to claim 2 wherein an additional control circuit is provided for setting the pressure medium control valve, in which a signal representative of the setting of the valve is additively combined with the error signal applied to control the valve.

13. A method for regulating the position of a working piston in a piston engine hydrostatic motion convertor comprising the steps of adding and withdrawing hydraulic fluid from the motion convertor, observing the position of the piston and the rotational angle of the drive shaft, converting said observation into a correspondence error signal in response to said piston and drive shaft being out of synchronization; controlling the flow of hydraulic fluid into and out of the convertor to reduce said correspondence error signal; comparing the actual dead point position of the piston with the designed and preestablished nominal dead point position of the piston, forming a dead point error signal in response to said comparison, controlling the flow of hydraulic fluid into and out of the convertor to reduce said dead point error signal, and switching said hydraulic fluid flow control to be activated by said correspondence error signal below a predetermined engine speed and to be activated by said dead center error signal above a chosen engine speed.

14. The method according to claim 13, wherein the switching of said hydraulic fluid control from actuation by the correspondence error signal to the dead point error signal occurs at an engine speed which is higher than the engine speed at which there is a switchover from dead point error signal to correspondence error signal.

15. A method according to claim 1, further including the steps of combining said correspondence and said dead point error signals with a signal that reflects the status of said hydraulic fluid flow into and out of said convertor.

* * * * *